Aug. 14, 1934.  E. L. KRAFT  1,969,851
WINDSHIELD FOR AUTOMOBILES
Filed Sept. 2, 1931  2 Sheets-Sheet 1
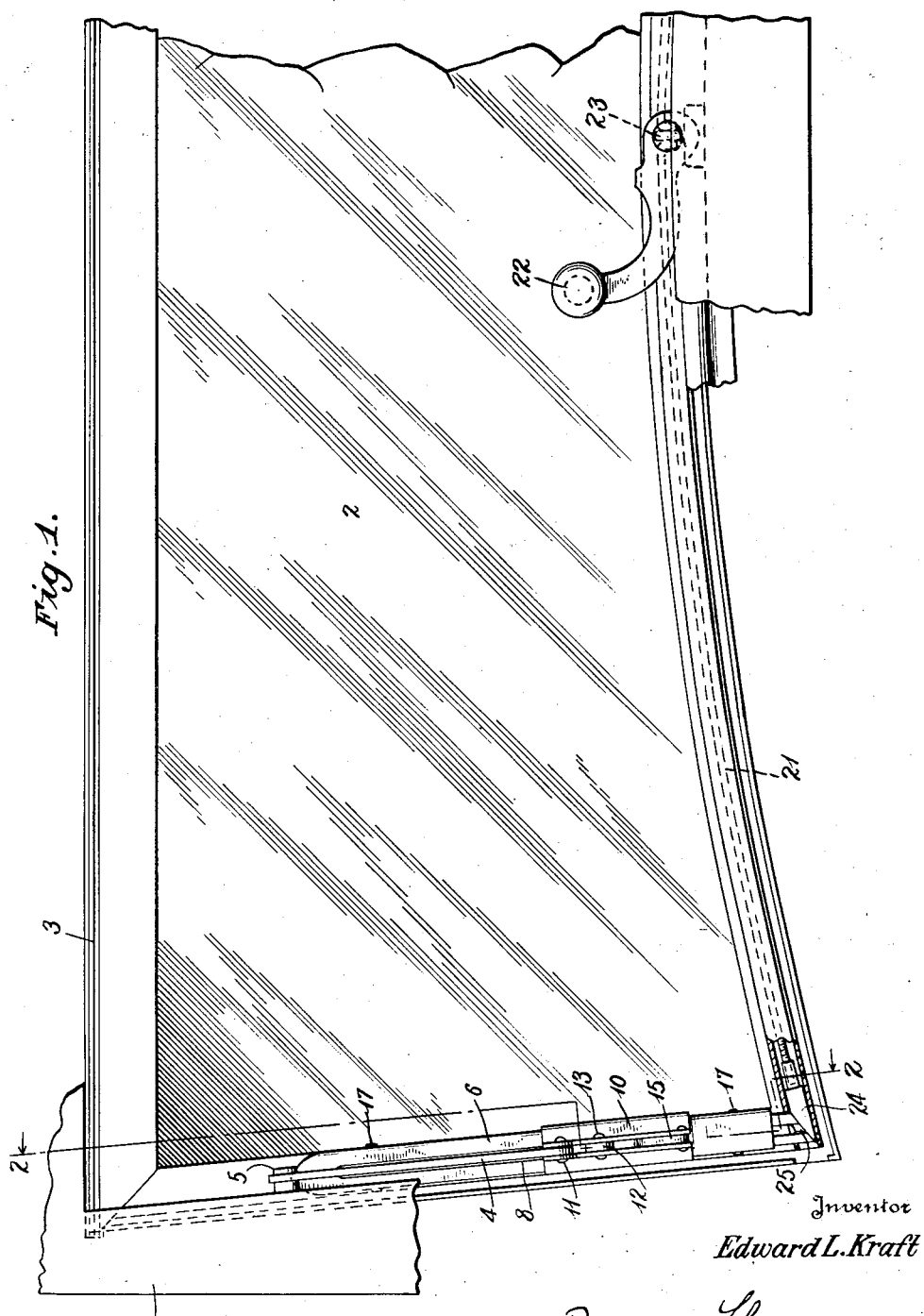
Inventor
Edward L. Kraft
By Bacon & Thomas
Attorneys Aug. 14, 1934.  E. L. KRAFT  1,969,851
WINDSHIELD FOR AUTOMOBILES
Filed Sept. 2, 1931  2 Sheets-Sheet 2
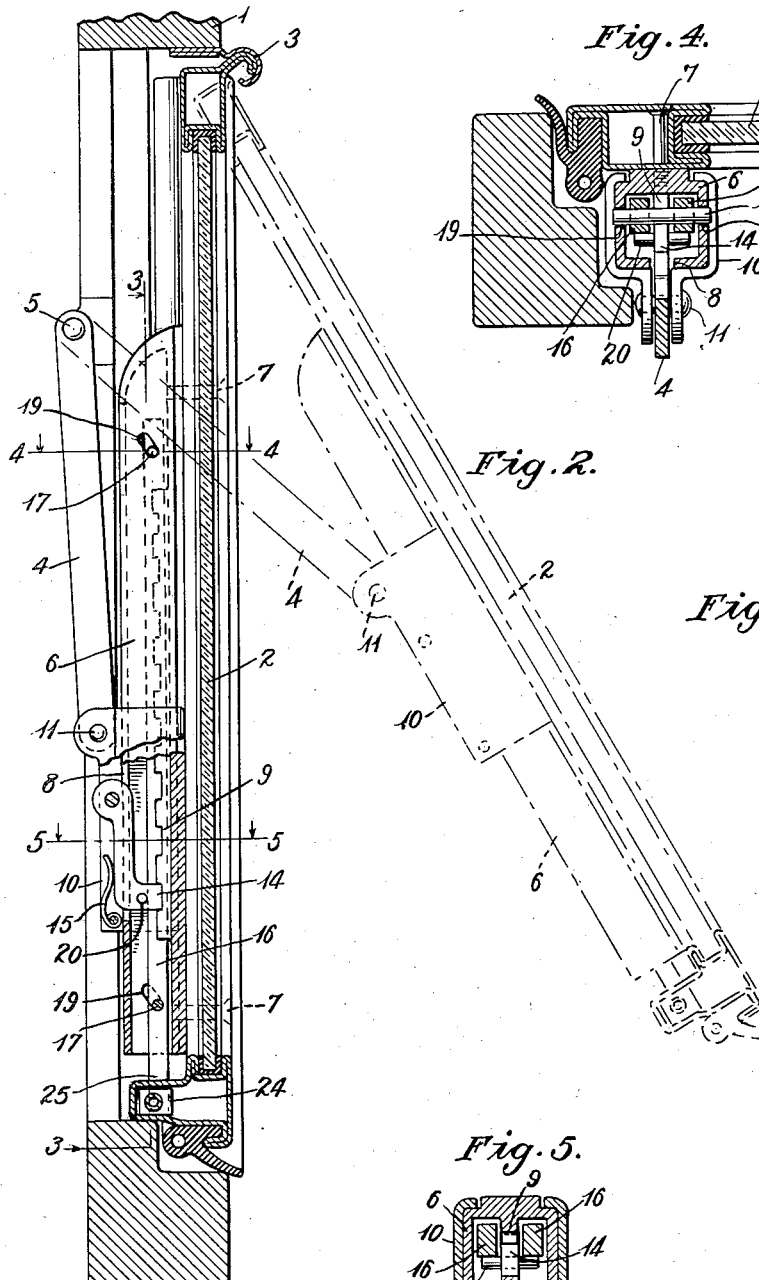
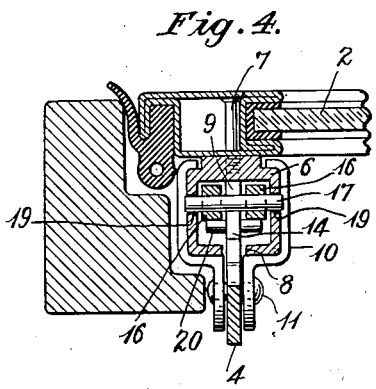
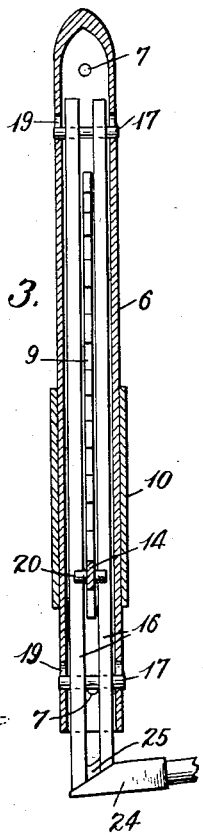
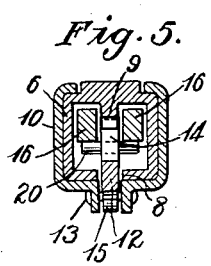
Inventor
Edward L. Kraft
By Bacon & Thomas
Attorneys Patented Aug. 14, 1934

1,969,851

UNITED STATES PATENT OFFICE 1,969,851

WINDSHIELD FOR AUTOMOBILES

Edward L. Kraft, York, Pa., assignor to Martin-Parry Corporation, York, Pa., a corporation of Delaware Application September 2, 1931, Serial No. 560,813

8 Claims. (Cl. 296—84)

This invention relates to controlling mechanism for automobile windshields. It constitutes an improvement upon the idea broadly claimed in the Beitman application, Serial No. 386,780, filed August 19, 1929.

An object of the invention is to provide a simple form of mechanism for locking the shield in its desired position of adjustment.

More specifically the invention relates to mechanism for imparting reciprocating motion to guide rods for the purpose of engaging or disengaging a latch from a rack to thereby lock or unlock the brace arm or arms to the windshield.

Other objects of the invention will be apparent to those skilled in the art from a reading of the following specification in conjunction with the drawings attached hereto forming a part hereof in which Fig. 1 represents a front view of a portion of the shield showing the manner in which my controlling and latching mechanism is applied and concealed from view;

Fig. 2 is a vertical view partly in section and taken on line 2—2 of Fig. 1 showing the latching mechanism in detail;

Fig. 3 is a detail sectional view on line 3—3 of Fig. 2 showing the manner of effecting the reciprocation of the guide rods for engaging or disengaging the latch from the rack;

Fig. 4 is a detail sectional view taken on line 4—4 of Fig. 2; and

Fig. 5 is a sectional view taken on line 5—5 of Fig. 2.

Referring now to the drawings, 1 represents a windshield frame of the conventional type; 2 a swinging windshield hinged at 3. The shield is provided with a brace arm on one or both sides thereof indicated at 4 hinged to the windshield frame at 5. The windshield has secured thereto a housing 6 fastened by the bolts 7 as shown in Figs. 3 and 4. This housing has a slot 8 in the front face thereof and a rack 9, shown particularly in Fig. 5. The rack is integral or may be fixed to the housing in any desired manner. The bracing arm 4 is pivoted to the sliding sleeve 10 as at 11. This sleeve is capable of sliding back and forth on the housing in accordance with the movements of the shield. A pivoted latch 12 is secured to the casing by the pivot 13 and is provided with an end portion 14 adapted to engage the rack 9 as hereinafter described. A spring 15 normally presses the rocking latch into its engagement with the rack.

Positioned within the housing 6 are a pair of guide rods 16 as shown particularly in Fig. 4 which are connected by the guide pins 17. The guide pins engage obliquely disposed slots 19 provided in the side walls of the housing as shown. One of these guide pins is provided at the top and one at the bottom of the housing, as shown in Fig. 2.

When the guide rods are vertically moved, as hereinafter described, the guide pins and slots cause the rods to move laterally or backwardly from the shield (as viewed in Fig. 4). A latch pin 20 is secured to the rocking latch 12, as shown in Fig. 5, and is positioned in the rear of the guide rods 16, as shown in Fig. 5, so that when the guide rods are pushed upwardly and laterally, as described, the latch is pushed rearwardly out of engagement with the rack against the tension of the spring 15.

To effect the actuation of the vertically movable guide rods, the lower edge of the windshield has housed therein one or more push rods 21 which are actuated by the handle 22 having the cam 23 engaging the inner ends of the push rods. A wedge 24 is secured to the outer end of each push rod which engages the lower ends of its guide rods as at 25, shown in Fig. 3. This causes the upward sliding movement of the guide rods and, by virtue of the guide pins and slots, the lateral movement thereof, carrying with them the pivoted latch 12 so that it is maintained in a position out of engagement with the rack. When unlocked, the handle 22 may be used to adjust the shield because the sliding sleeve freely reciprocates upon the housing. When the desired position of adjustment is reached, the handle is given an opposite turn which withdraws the wedge 24 from engagement with the guide rods 25, and the latch by virtue of the spring 15 therefore moves into its position of engagement with the rack. The guide rods, with or without the aid of the spring 15, by gravity, may return to their normal position, or this action may be accelerated in any desired manner.

Having thus described my invention, what I claim is:

1. In combination, a frame, a closure swingingly mounted therein, means for securing the closure in various positions of adjustment, said means including a brace, an element secured to the closure and immovable with respect thereto, a sleeve slidably mounted on said element and secured to the brace device, a spring pressed, pivoted locking device carried by and for restraining movement of the sleeve, and means for actuating said locking device at the will of the operator.

2. In combination, a frame, a closure swingingly mounted therein, means for securing the closure in various positions of adjustment, said means comprising a housing secured to the closure, a bracing arm, a sleeve secured to the bracing arm and slidably mounted on said housing, a pivoted latch secured to the sleeve, a rack within the housing for engagement by said latch, slidable devices mounted within the housing, a controlling handle, connections between the controlling handle and the slidable devices for actuating the same, and means between said slidable devices and said latch for disengaging said latch from the rack.

3. In combination, a frame, a closure swingingly mounted therein, means for securing the closure in various positions of adjustment, said means comprising a brace arm, a housing secured to the closure and movable therewith, a sleeve secured to the brace arm and slidable relative to said housing, guide rods slidably mounted within the housing, a latch carried by the sleeve and a rack within the housing with which the latch cooperates, a connection between the guide rods and the latch for causing the latch to be moved laterally out of engagement with the rack upon the movement of said guide rods, and means for vertically moving said guide rods.

4. In combination, a frame, a closure swingingly mounted therein, and means for securing the closure in any desired position of adjustment, said means comprising an elongated housing secured to the closure and having a slot extending lengthwise thereof, a sleeve slidably encircling the housing, a fixed locking element extending longitudinally of and arranged within the housing, a pivoted latch carried by the sleeve and entering the housing through its slot to selectively engage the locking element at different positions throughout its length, means arranged within the housing and having a compound movement with respect thereto for shifting the pivoted latch into and out of locking engagement with the locking element, and a brace pivotally connected to the sleeve and the frame.

5. In combination, a frame, a closure swingingly mounted therein, and means for securing the closure in any desired position of adjustment, said means comprising an elongated, slotted housing secured to the closure, a toothed member immovably arranged in the housing, a sleeve slidable on the housing, means carried by the sleeve and projecting into the housing through its slot to selectively engage different teeth of said member for holding the sleeve from movement relative to the housing, means within the housing for controlling movement of the means carried by the sleeve into and out of engagement with the toothed member, and a brace connected to the sleeve and the frame.

6. In combination, a frame, a closure swingingly mountd therein, and means for securing the closure in any desired position of adjustment, said means comprising an elongated, slotted housing secured to the closure, a rack bar immovably arranged in the housing, a sleeve slidable on the housing, a pivoted latch carried by the sleeve and projecting into the housing through its slot to selectively engage different teeth of said member for holding the sleeve from movement relative to the housing, and means within the housing for controlling movement of the latch into and out of engagement with the rack bar, and a brace connected to the sleeve and the frame.

7. In combination, a frame, a closure swingingly mounted therein, and means for securing the closure in any desired position of adjustment, said means comprising an elongated, slotted housing secured to the closure, a rack bar immovably arranged in the housing, a sleeve slidable on the housing, a pivoted latch carried by the sleeve and projecting into the housing through its slot to selectively engage different teeth of said rack bar for holding the sleeve from movement relative to the housing, means arranged within the housing and partaking of transverse and longitudinal movement with respect thereto for controlling the movements of the latch relative to the rack bar, and a brace connected to the sleeve and the frame.

8. In combination, a frame, a closure swingingly mounted therein, and means for securing the closure in any desired position of adjustment, said means comprising an elongated, slotted housing secured to the closure, a rack bar immovably arranged in the housing, a sleeve slidable on the housing, a pivoted latch carried by the sleeve and projecting into the housing through its slot to selectively engage different teeth of said rack bar for holding the sleeve from movement relative to the housing, a projection on the latch, means within the housing and engageable with the latch projection to control the movements of the latch, and a brace connected to the sleeve and the frame.

EDWARD L. KRAFT.